July 31, 1962   J. RODGER   3,046,716
ELECTRODES AND SHIELDS
Filed May 14, 1959
FIG. 1
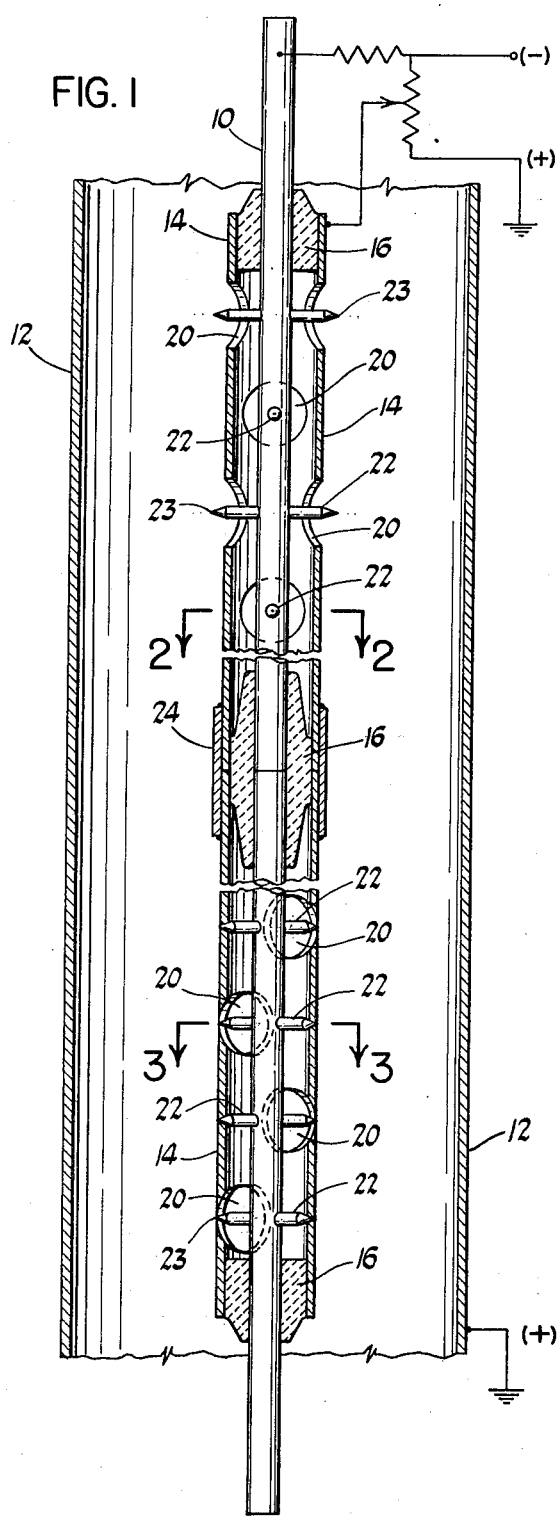
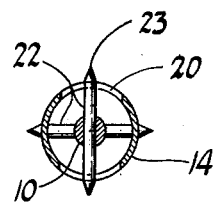
FIG. 2
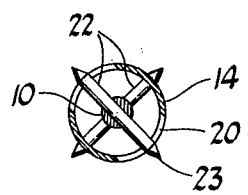
FIG. 3
INVENTOR
JAMES RODGER
BY
*James J. Whalen*
ATTORNEY

United States Patent Office 3,046,716
Patented July 31, 1962

3,046,716
ELECTRODES AND SHIELDS
James Rodger, Paisley, Scotland, assignor to Apra Precipitator Corporation, New York, N.Y., a corporation of Delaware
Filed May 14, 1959, Ser. No. 813,263
2 Claims. (Cl. 55—152)

This invention relates to electrostatic precipitators of the type wherein dust particles suspended in a gaseous medium are given an electrostatic charge during their passage through a duct preferably in the form of a tubular cell wherein an electric field exists and an ionic current flows between a discharge electrode and a spaced counter electrode, for example, formed by the above mentioned tube wall, so that the charged particles are attracted to and precipitated on the said tube wall.

The invention relates more particularly to precipitators of the above mentioned type wherein the discharge electrode is composed of a number of discharge surfaces which may take the form of discs, pins, tabs or barbs mounted on a rigid supporting stem.

The ionising or charging current during its passage between the discharge and collecting electrodes must traverse two distinct media i.e. the dust laden gas and the layer of dust precipitated on the collecting surface. These media may vary extensively in respect of their chemical and physical properties, particle size and shape and the like due to changing conditions at their source; for example, changes in coal, combustion or loading in a steam boiler.

It is well known that these variations may give rise to conditions whereby the optimum electrical desiderata for the efficient collection of dust cannot be attained due to one or more of the following causes:

(a) Electrical breakdown of the media, resulting in persistent flashovers between the discharge and collecting electrodes even when the voltage and current are below the desired values.

(b) Excessive current at a voltage lower than that which is useful for dust collection due to electrical breakdown of the dust layer on the collecting surface i.e. the phenomenon known as back ionisation.

(c) Excessive current at a voltage lower than that which is useful due to adhesion or precipitation of dust particles on the discharge electrode. This condition, in general, results from the existence of "back ionisation" and tends to aggravate the condition of back ionisation.

(d) Migration of dust particles between electrodes resulting in re-entrainment by the gas and the subsequent escape of previously precipitated dust.

(e) Neutralisation or reversal of the normal process of precipitation, resulting from one or more of the aforementioned phenomena, whereby the dust collecting efficiency of the precipitator is greatly impaired.

In electrostatic precipitators of the type hereinbefore set forth where the necessary electric power in the form of high tension direct current is derived from a single source, the current-voltage characteristic of the unit is dependent entirely on the condition and properties of the gas and dust under treatment. Hitherto the optimum working point in respect of current and voltage could not be selected merely by adjustment of the electrical supply to the discharge electrode and it has been necessary to apply external remedies such as the chemical pretreatment of the gases presented for cleaning.

One object of this invention is to provide means responsive to adjustment of the electrical supply adapted to vary the ionisation characteristic of the discharge electrode as required to suit the conditions prevailing within the cells.

A further object is to provide a method of varying the operating characteristics of the precipitator.

According to one feature of the present invention a method of operating an electrostatic precipitator of the type hereinbefore set forth includes the step of varying the operating characteristic of the precipitator by adjustment of a voltage applied to a shield or grid associated with the discharge electrode. Preferably the shield or grid shrouds the surface of the discharge electrode other than the discharge surfaces thereof.

According to a further feature of the present invention an electrostatic precipitator of the type hereinbefore set forth includes a shield or grid provided in each precipitator cell and either connected to a source of potential variable between zero and a value slightly exceeding that of the discharge electrode or unconnected to a source of potential.

Preferably the shield or grid comprises an apertured tube or sheath disposed around the discharge electrode and the discharge surfaces of the discharge electrode project from within the shield toward or through the apertures thereof.

In the drawings:

FIGURE 1 is an elevational view, partly in section, of an electrode assembly embodying the invention;

FIGURES 2, 3 are cross-sectional views on correspondingly designated section lines in FIGURE 1.

The discharge electrode may consist of a rod extending through a shield and the discharge surfaces may consist of pointed pins or probes extending radially from the rod, all being located centrally within a tubular duct through which the dust laden gas flows.

In a preferred embodiment of the invention a discharge electrode within one of the many tubular cells or gas ducts of an electrostatic precipitator is formed of a rod 10 and extends coaxially of the tubular cell 12 and is surrounded by a tubular shield 14. The rod 10 is supported in and insulated from the shield 14 by insulating bushes 16, preferably formed of ceramic material.

Spaced apertures 20 are formed in the tubular shield 14 along the length thereof. Discharge points consisting of short pins 22 are secured to the discharge electrode rod 10 and extend radially therefrom to protrude through the apertures 20 of the shield, the radially outer ends 23 of the pins being pointed or of small radius of curvature. The apertures 20 are of such diameter as to provide a clearance between the discharge points 23 and the shield 14.

As shown the pins 22 are double ended and pierce the electrode rod 10 so as to project from diametrically opposite points of its circumference. Alternate pins axially of the electrode are located at 90° with respect to the preceding and following pins. The entire rod 10 is in several axially coupled sections interconnected by sleeves 24. The circumferential location of the pins on the different sections may be varied so that the pins of adjacent sections are not necessarily in alinement axially of the electrode as may be noted on the upper and lower part of FIG. 1. Likewise the axial spacing of the pins 22 may vary at different points along the electrode 10.

The assembly of discharge electrode 10, 22 and shield 14 is disposed centrally in a counter electrode formed by the tube 12 of hexagonal or circular cross-section, or the assembly may be interposed between an assembly of spaced parallel plates which form the counter electrode of collecting surface.

The counter electrode 12 is normally maintained at earth potential and a high negative potential is applied to the discharge electrode 10. The shield 14 may be maintained at any desired potential, with respect to earth, between zero and a potential in excess of that of the discharge electrode 10 as by being connected to a source of supply. Alternatively it may be connected to the counter electrode 12 through a high resistance or may have no connection to any source of supply. The potential of the shield 14 may be varied according to the conditions prevailing in the cells 12 so as to maintain the efficiency of the precipitator at high level.

What I claim is:

1. In an electrostatic precipitator having an electrically grounded collecting surface; a discharge electrode of conductive material associated with said surface; a plurality of pins of conductive material projecting radially from said discharge electrode and being disposed thereon in axially and circumferentially spaced relationships; and a cylindrical shield of conductive material surrounding said discharge electrode electrically insulated therefrom and formed with apertures through which said pins extend toward said collecting surface.

2. In an electrostatic precipitator having an electrically grounded collecting surface; a discharge electrode comprising; an elongated rod of conductive material; a plurality of axially spaced protuberances projecting from the rod toward said collecting surface; a shield electrically insulated from said rod and disposed between said rod and said collecting surface and formed with apertures opposite said protuberances, the said protuberances on said electrode rod projecting through the apertures in said shield so that their ends lie between the shield and said collecting surface.

References Cited in the file of this patent

UNITED STATES PATENTS

| | | |
|---|---|---|
| 1,345,790 | Lodge | July 6, 1920 |
| 2,142,129 | Hoss et al. | Jan. 3, 1939 |

FOREIGN PATENTS

| | | |
|---|---|---|
| 489,791 | France | Oct. 31, 1918 |
| 553,420 | Great Britain | May 20, 1942 |